UNITED STATES PATENT OFFICE.

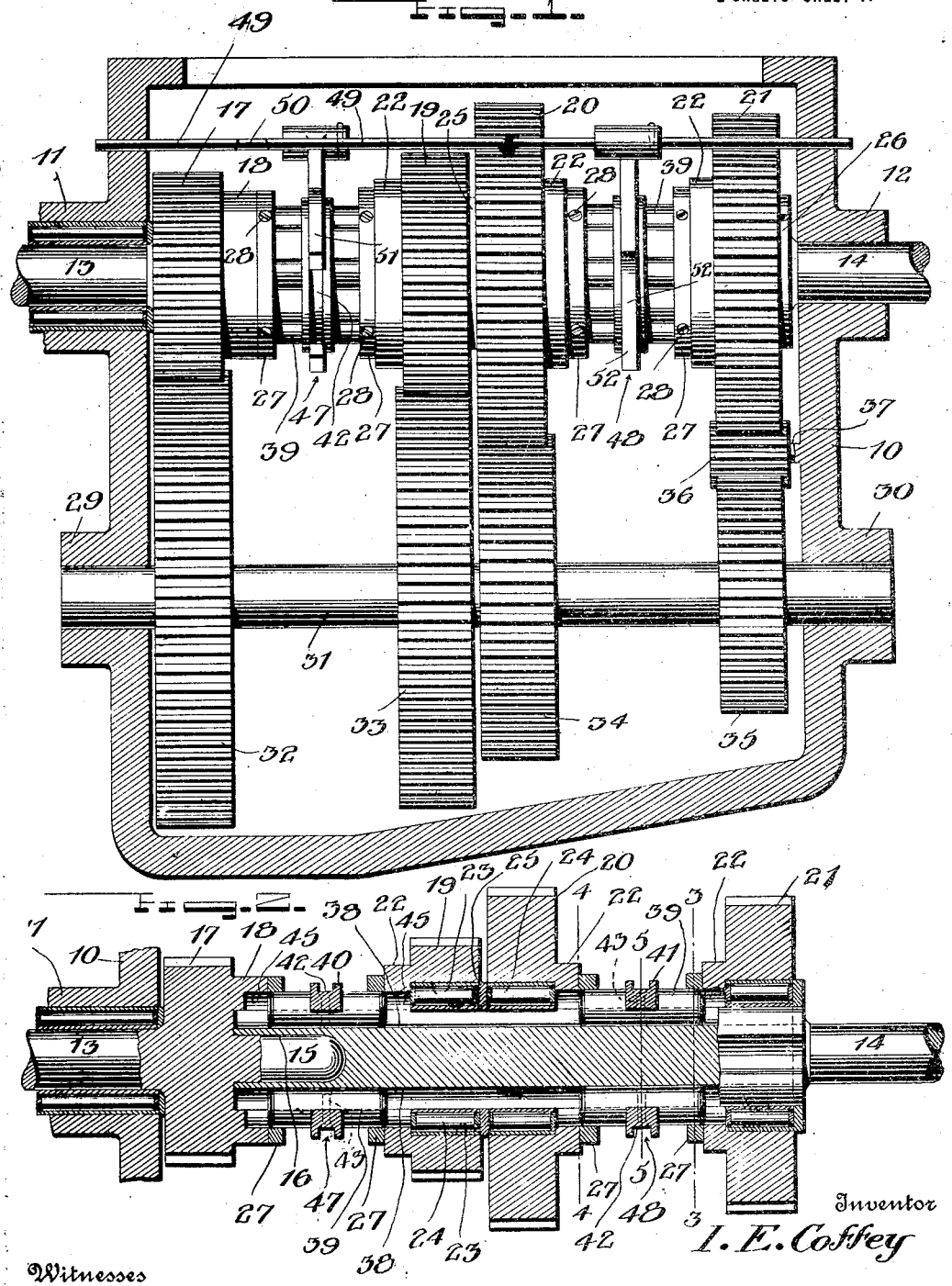

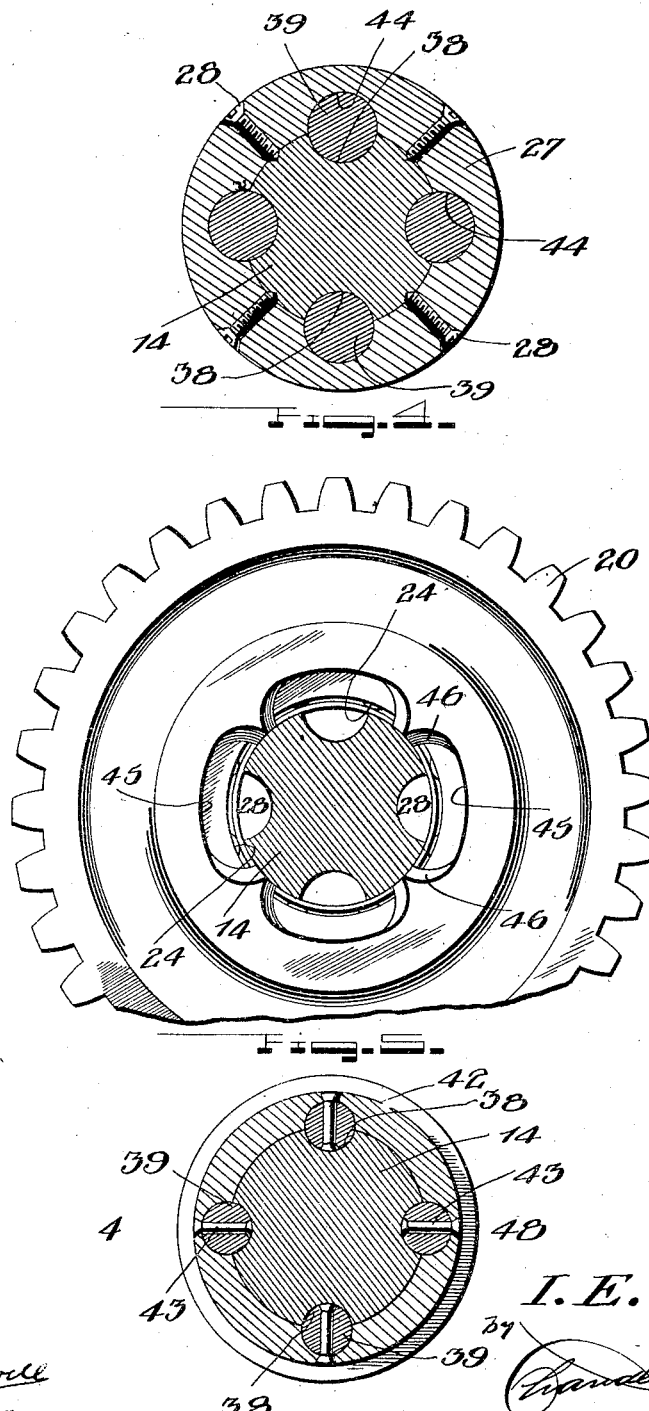

IRVEN E. COFFEY, OF LAWTON, OKLAHOMA.

CLUTCH FOR TRANSMISSION-GEARING.

1,199,452.

Specification of Letters Patent.

Patented Sept. 26, 1916.

Application filed April 1, 1912. Serial No. 687,632.

*To all whom it may concern:*

Be it known that I, IRVEN E. COFFEY, a citizen of the United States, residing at Lawton, in the county of Comanche, State of Oklahoma, have invented certain new and useful Improvements in Clutches for Transmission-Gearing; and I do hereby declare the following to be a full, clear, and exact description of the invention, such as will enable others skilled in the art to which it appertains to make and use the same.

My invention relates to new and useful improvements in clutches for transmission gearing for motor vehicles of the type in which all of the gears are constantly in mesh, the selective drive being obtained by means of clutches carried by the driven shaft and adapted to be moved in and out of engagement with the various gears to lock the same upon the shaft, and the object of my invention is to improve the construction and increase the efficiency of clutches of the above described type.

With this and other objects in view, my invention will be more fully described, illustrated in the accompanying drawings which show a preferred embodiment of my device and then specifically pointed out in the claims which are attached to and form a part of this specification.

In the drawings, Figure 1 is a side elevation of my improved clutch mechanism, the casing being shown in section. Fig. 2 is a central longitudinal section of the driving shaft and driven shaft together with the gears and clutches carried thereby. Fig. 3 is a section on the line 3—3 of Fig. 2. Fig. 4 is a section on the line 4—4 of Fig. 2. Fig. 5 is a section on the line 5—5 of Fig. 2.

It is to be noted that I have herein shown and described the clutch as applied to a transmission gearing so that the action of the clutch and its purpose may be more fully comprehended.

Referring more specifically to the drawings, in which similar reference numerals designate corresponding parts throughout, 10 designates the casing of my improved transmission gearing and, as shown, this casing is preferably cast in a single piece and open at its upper side to establish communication with any preferred form of transmission mechanism, which, in practice, will be inclosed in a second casing mounted upon the open upper side of the casing 10. The end walls of this casing are provided with alined bearings 11 and 12 and one end of the driving shaft 13 is journaled in the bearing 11 while the driven shaft 14 is journaled in the opposite bearing 12. As shown, the driving shaft 13 extends but a slight distance within the casing and terminates in a reduced trunnion 15 which engages in a socket 16 formed in the abutting end of the shaft 14 by which means the driving and driven shafts are maintained in alinement. The trunnion 15 is cylindrical in shape as is the socket 16 and it will therefore be seen that either shaft may be rotated independent of the other.

Keyed upon that portion of the shaft 13 within the casing, is a spur gear 17 having a hub portion 18 which extends inwardly over the end of the driven shaft 14 for a reason which will be hereinafter explained. Spur gears 19, 20 and 21, each provided with a laterally directed hub 22, are bored to receive the driven shaft 14 and the bodies of these gears are counterbored to form an annular recess 23 about the shaft in which are positioned a plurality of bearing rollers 24 by means of which the gears may be rotated about the shaft without undue friction. As shown, the gears 19 and 20 are positioned adjacent each other and centrally of the casing, being separated merely by a bearing ring 25 while the gear 21 is positioned upon the shaft adjacent the rear wall of the casing from which it is separated only by the bearing ring 26. The gears 19 and 20 are held against longitudinal movement upon the shaft by means of collars 27 which are secured against movement upon the shaft by means of a plurality of set screws 28, said collars being positioned one to bear against the forwardly directed hub 22 of the gear 19 and the other to bear against the oppositely directed hub of the gear 20. The gear 21 is also held against longitudinal movement by a similar collar secured to the shaft and bearing against its hub, which is directed toward the hub of the gear 20. Another collar 27 is also secured to the shaft 14 and bears against the extended hub 18 of the gear 17. The casing 10 is further provided with alined bearings 29 and 30 which are positioned below the bearings 11 and 12, and journaled in these bearings is a jack shaft 31 upon which are keyed spur gears 32, 33, 34, and 35, the spur gear 32 meshing with the spur gear 17 of the driving shaft while the spur gears 33 and 34 mesh with the spur gears 19 and 20, respectively, of the driven shaft. The spur gear 35 meshes with a spur gear 36 which is idly mounted upon a stub shaft 37 carried by the casing and which meshes with the spur gear 21 of the driven shaft.

Those portions of the driven shaft 14 lying between the gears 17 and 19 and between the gears 20 and 21 are provided with a plurality of spaced longitudinally extending grooves or channels 38 which are semi-circular in cross section and which are prolonged to extend beneath the hub portions 18 and 22 of the gears. Positioned in these grooves and slidable therein, are a plurality of cylindrical locking fingers 39 which are preferably formed with slightly rounded ends and which extend beyond the periphery of the shaft as shown, those locking fingers positioned between the gears 17 and 19 being maintained in place by means of a collar 40 which is bored to receive the shaft 14 and further recessed to receive the extending portions of the locking fingers while the locking fingers positioned between the gears 20 and 21 are maintained in position by a similar collar 41. Each of these collars 40 and 41 is provided with a peripheral groove 42 and the locking fingers are secured against movement independent of these collars by means of bolts 43 which are passed through the collars and into the locking fingers intermediate the length of the latter, the heads of the bolts being preferably countersunk in the collars.

The bearing collars 27 are provided with semi-circular apertures 44 to receive the ends of the locking fingers and the hubs 18 and 22 of the gears are provided with arcuate sockets 45 into which the ends of the locking fingers may be forced. The outer ends of these sockets are preferably widened as at 46 for more ready reception of the locking fingers, said sockets tapering gradually inwardly as shown. The sockets 45 are materially wider than the coacting portions of the pins or fingers. It is well known that it is possible to mesh gear teeth or clutch teeth as long as their relative speeds do not exceed a critical rate. This critical rate may be increased by providing a greater clearance between the coacting parts. In the present case, the large amount of clearance space provided by the sockets 45 insures that the pins may be inserted therein at all ordinary rates of relative speed of these parts. This operation is also facilitated by the flaring mouths of the sockets.

As will be readily seen, if the collar 41 is moved to seat its locking fingers 39 in the sockets of the gear 21, said gear will be locked to the shaft 14, while if the collar is moved to bring the fingers in engagement with the gear 20, said latter gear will be locked to the shaft 14. If the collar 40 is moved to bring its locking fingers 39 into engagement with the sockets of the gear 22, said gear will be locked to the shaft 14, while if it is moved to bring its locking fingers into engagement with the hub 18 of the gear 17, the shafts 13 and 14 will be locked together to revolve as one. It will thus be seen that the collars 40 and 41 together with their locking fingers form clutches which will hereinafter be referred to as a whole by the numerals 47 and 48 respectively. It will further be seen that the collars 27 not only serve as a thrust bearing for the gears but also as guides and supports for the locking fingers of the clutches.

Slidably mounted in suitable bores formed in the upper portion of the front and rear walls of the casing 10 one upon either side of the shaft 14 and above the same, are parallel rods 49 and 50 and secured to these rods are laterally directed arms terminating in forks 51 and 52 respectively, the fork 51 engaging in the grove 42 of the clutch 47 while the fork 52 engages in the grove of the clutch 48. As will be seen the reciprocation of these rods will act through their fork arms to reciprocate the clutches to throw them in and out of operative position. These rods may be reciprocated by means of any preferred form of transmission controlling mechanism, a suitable form of controlling mechanism being illustrated and described in my co-pending application.

In operation, suppose the clutches 47 and 48 to be in inoperative position as shown in Fig. 1. The rod 49 is then moved to force the clutch 48 into engagement with the gear 20 when the drive will act through the shaft 13, gear 17, gear 32, gear 34, gear 20 and shaft 14 which is the low speed of the transmission mechanism. When sufficient headway has been obtained, the clutch 48 may be moved back to neutral position and the rod 50 actuated to move the clutch 47 into locking engagement with the gear 19 when intermediate drive will take place, the power being transmitted through the gears 17, 32, 33 and 19. The transmission mechanism may then be thrown into high gear by moving the clutch 47 out of engagement with the gear 19 and into engagement with the gear 17, thus locking the driving and driven shafts together. If the gears are in neutral position and the operator desires to reverse the drive, the clutch 48 is moved into engagement with the gear 21, when the drive will be through the gears 17, gears 32, 35, the idle gear 36 and the gear 21, the idle gear 36 serving to reverse the direction of motion of the driven shaft 14.

From the foregoing description, it will be apparent that I have provided a simple and effective form of selective transmission gearing in which all gears are constantly in mesh, the selective drive being obtained by the locking of certain of the gears upon the driven shaft by means of a novel form of clutch.

It will, of course, be understood that minor changes in the details of construction may be made if desired without in the slightest degree departing from the spirit of my invention.

What I claim is:—

1. In a device of the kind described, a shaft provided with longitudinal grooves, a pair of clutch members revolubly mounted on said shaft and provided with internal grooves, arcuate in cross section and having flaring mouths, pins slidable in either direction from a central position in the grooves of the shaft and engageable in the grooves of the clutch members, and means for actuating said pins into and out of engagement with the grooves of the clutch member.

2. In a device of the kind described, a shaft provided with longitudinal grooves, arcuate in cross section and having flaring mouths, a clutch member revolubly mounted on said shaft and provided with internal grooves, pins slidable in the grooves of the shaft and engageable in the grooves of the clutch member, a collar surrounding said pins and attached thereto, and means engaging the collar for actuating the collar along said shaft and cause the pins to move into and out of engagement with the grooves of the clutch member.

3. In a device of the kind described, a shaft provided with spaced longitudinal grooves, a clutch member revolubly mounted on said shaft and provided with spaced internal grooves arcuate in cross section and having flaring mouths, pins slidably mounted in the grooves of the shaft and adapted to enter the grooves of the clutch member, and means for actuating said pins simultaneously into and out of engagement with the grooves of the clutch member.

4. In a device of the kind described, a shaft provided with spaced longitudinal grooves, a clutch member revolubly mounted on said shaft and having internal grooves arcuate in cross section and having flaring mouths, a guide collar fixed on said shaft and having grooves registering with the grooves of the shaft, pins slidably mounted in the shaft and collar grooves and adapted to engage the grooves of the clutch member, and means for moving said pins into and out of engagement with said clutch member.

5. In a device of the kind described, a shaft provided with longitudinal grooves, a pair of clutch members revolubly mounted on said shaft and provided with internal grooves, a guide collar on said shaft having grooves registering with the grooves of the shaft, pins slidable in either direction from a central position in the grooves of the shaft and engageable in the grooves of the clutch members, and means for moving said pins into and out of engagement with the grooves of the clutch members.

In testimony whereof, I affix my signature, in presence of two witnesses.

IRVEN E. COFFEY.

Witnesses:
M. KOEHLER,
C. L. OLDFIELD.